US009341871B2

(12) United States Patent
Jeong et al.

(10) Patent No.: US 9,341,871 B2
(45) Date of Patent: May 17, 2016

(54) METHOD OF DRIVING LIQUID CRYSTAL LENS, LIQUID CRYSTAL LENS MODULE FOR PERFORMING THE METHOD AND DISPLAY APPARATUS HAVING THE LIQUID CRYSTAL LENS MODULE

(75) Inventors: Ji-Woong Jeong, Yongin-si (KR); Joo-Young Kim, Suwon-si (KR); Cheol-Woo Park, Suwon-si (KR); Mun-San Park, Hwaseong-si (KR)

(73) Assignee: SAMSUNG DISPLAY, CO., LTD., Yongin, Gyeonggi-Do (KR)

( * ) Notice: Subject to any disclaimer, the term of this patent is extended or adjusted under 35 U.S.C. 154(b) by 673 days.

(21) Appl. No.: 13/242,823

(22) Filed: Sep. 23, 2011

(65) Prior Publication Data

US 2012/0249506 A1 Oct. 4, 2012

(30) Foreign Application Priority Data

Apr. 1, 2011 (KR) .............................. 2011-0030267

(51) Int. Cl.
*G06F 3/038* (2013.01)
*G09G 5/00* (2006.01)
*G06T 15/00* (2011.01)
*G02F 1/13* (2006.01)
*G02F 1/133* (2006.01)
*H04N 13/04* (2006.01)
*G02F 1/1347* (2006.01)

(52) U.S. Cl.
CPC ........ *G02F 1/13306* (2013.01); *H04N 13/0404* (2013.01); *H04N 13/0415* (2013.01); *H04N 13/0454* (2013.01); *G02F 1/13471* (2013.01)

(58) Field of Classification Search
CPC .......... H04N 13/0404; H04N 13/0415; H04N 13/0454
USPC .............................. 345/204–211; 349/15, 200
See application file for complete search history.

(56) References Cited

U.S. PATENT DOCUMENTS

| | | | |
|---|---|---|---|
| 2011/0032438 A1* | 2/2011 | Yun et al. .......................... | 349/15 |
| 2011/0063533 A1* | 3/2011 | Kim et al. ......................... | 349/15 |
| 2011/0096071 A1* | 4/2011 | Okamoto et al. ............. | 345/419 |
| 2011/0157338 A1* | 6/2011 | Chang .............................. | 348/59 |
| 2011/0181827 A1* | 7/2011 | Takahashi et al. ............ | 349/200 |
| 2011/0273480 A1* | 11/2011 | Park et al. ...................... | 345/690 |
| 2012/0235991 A1* | 9/2012 | Huang ............... | G02B 27/2264 345/419 |

FOREIGN PATENT DOCUMENTS

| | | |
|---|---|---|
| JP | 2000-102038 | 4/2000 |
| JP | 2010-164852 | 7/2010 |
| KR | 100293983 | 4/2001 |
| KR | 1020100075302 | 7/2010 |

* cited by examiner

*Primary Examiner* — Temesgh Ghebretinsae
*Assistant Examiner* — Kwin Xie
(74) *Attorney, Agent, or Firm* — F. Chau & Associates, LLC (57) ABSTRACT

A method of driving liquid crystal lens includes identifying a driving mode and driving unit lenses of the liquid crystal lens. The driving mode includes a two-dimensional ("2D") mode and a three-dimensional ("3D") mode. Driving timings of the unit lenses are different from each other in the 3D mode.

17 Claims, 7 Drawing Sheets

METHOD OF DRIVING LIQUID CRYSTAL LENS, LIQUID CRYSTAL LENS MODULE FOR PERFORMING THE METHOD AND DISPLAY APPARATUS HAVING THE LIQUID CRYSTAL LENS MODULE

CROSS-REFERENCE TO RELATED APPLICATION

This application claims under 35 U.S.C. §119 priority to and the benefit of Korean Patent Application No. 2011-30267, filed on Apr. 1, 2011, the entire content of which is incorporated by reference herein.

BACKGROUND

1. Technical Field

The present disclosure relates to a method of driving a liquid crystal lens, a liquid crystal lens module for performing the method and a display apparatus having the liquid crystal lens module, and, more particularly, to a method of driving a liquid crystal lens for displaying a two-dimensional ("2D") image and a three-dimensional ("3D") stereoscopic image, a liquid crystal lens module for performing the method and a display apparatus having the liquid crystal lens module.

2. Discussion of the Related Art

A typical liquid crystal display ("LCD") apparatus displays a 2D image. Recently, with the increasing demand for displaying a 3D stereoscopic image in the video game and movie industries, an LCD apparatus has been developed to display 3D stereoscopic images.

The LCD apparatus typically displays the 3D stereoscopic image using a binocular parallax between the two eyes of a human being. For example, since the two eyes of the human being are spaced apart from each other, images viewed at different angles are inputted to the brain. The brain then mixes the images so that an observer may recognize the stereoscopic image.

The LCD apparatus displaying the 3D stereoscopic image may be divided into a stereoscopic type and an auto-stereoscopic type based upon wearing extra eyeglasses or not. The stereoscopic type may include anaglyph and shutter type glasses, and the like. The autostereoscopic type may include barrier, lenticular, and liquid crystal lens types, and the like.

In the liquid crystal lens type device, light is refracted by the liquid crystal lens using a liquid crystal panel. The liquid crystal panel includes a first substrate having a lens electrode, a second substrate facing the first substrate, a common electrode, and a liquid crystal layer disposed between the first and second substrates. When a voltage is applied to the first and second substrates of the liquid crystal panel, the arrangement of liquid crystal molecules in the liquid crystal layer is changed. By changing the arrangement of the liquid crystal molecules, the liquid crystal panel can function as a liquid crystal lens.

As the size of the liquid crystal lens increases, the response time of the lens electrode and the common electrode is delayed, and the coupling capacitance between the lens electrode and the common electrode is increased. In addition, the driving current applied to the lens electrode is increased.

SUMMARY

Exemplary embodiments of the present invention provide a method wherein a liquid crystal lens is capable of effectively displaying a 2D image and a 3D stereoscopic image.

Exemplary embodiments of the present invention also provide for a liquid crystal lens module that can perform the method of driving the liquid crystal lens.

Exemplary embodiments of the present invention also provide a display apparatus having the liquid crystal lens module.

In an exemplary embodiment a method of driving a liquid crystal lens includes identifying a driving mode, the driving mode including a two-dimensional ("2D") mode and a three-dimensional ("3D") mode, and driving unit lenses of the liquid crystal lens, driving timings of the unit lenses being different from each other in the 3D mode.

In an exemplary embodiment driving the unit lenses may include generating lens control signals having timings different from each other, and outputting the lens control signals to lens driving chips respectively connected to a plurality of lens electrodes.

In an exemplary embodiment driving the unit lenses may include outputting a lens voltage to a first end portion of a lens electrode, and outputting the lens voltage to a second end portion of the lens electrode, the second end portion being opposite to the first end portion.

In an exemplary embodiment driving the unit lenses may include selecting one of first, second and third voltages, and outputting the selected voltage to a common electrode as the common voltage.

In an exemplary embodiment one of the first, second and third voltages may be selected using a vertical synchronizing signal of input image data and an inverting signal.

In an exemplary embodiment the first voltage may be a normal common voltage, the second voltage may be larger than the first voltage and may be outputted at a falling edge of a lens voltage applied to a lens electrode, and the third voltage may be smaller than the first voltage and may be outputted at a rising edge of the lens voltage.

In an exemplary embodiment the method may further include selectively generating a level of a light source driving voltage according to the driving mode.

In an exemplary embodiment the light source driving voltage in the 3D mode may be larger than that in the 2D mode.

In an exemplary embodiment driving the unit lenses may include generating a common voltage set to 0V in the 2D mode and outputting the common voltage to a common electrode.

In an exemplary embodiment a liquid crystal lens module includes: a liquid crystal lens including a plurality of unit lenses, each of the unit lenses being formed by a first substrate including a plurality of lens electrodes, a second substrate including a common electrode, and a liquid crystal layer disposed between the first and second substrates, and a controller configured to identify a driving mode, the driving mode including a two-dimensional ("2D") mode and a three-dimensional ("3D") mode, and to drive the unit lenses, driving timings of the unit lenses being different from each other in the 3D mode.

In an exemplary embodiment the controller may generate lens control signals having timings different from each other, and outputs the lens control signals to lens driving chips respectively connected to the lens electrodes.

In an exemplary embodiment the liquid crystal lens module may further include a first lens driver disposed adjacent to a first side of the first substrate and a second lens driver disposed adjacent to a second side of the first substrate, wherein: the first lens driver outputs a lens voltage to a first end portion of each of the lens electrodes, and the second lens driver outputs the lens voltage to a second end portion of each of the lens electrode, the second end portion being opposite to the first end portion.

In an exemplary embodiment the controller may generate a common voltage by selecting one of first, second and third voltages and outputs the common voltage to the common electrode.

In an exemplary embodiment the controller may select one of the first, second and third voltages using a vertical synchronizing signal of input image data and an inverting signal.

In an exemplary embodiment the first voltage may be a normal common voltage, the second voltage may be larger than the first voltage and is outputted at a falling edge of a lens voltage applied to each of the lens electrodes, and the third voltage may be smaller than the first voltage and is outputted at a rising edge of the lens voltage.

In an exemplary embodiment the controller may include a dimming part configured to selectively determine a level of a light source driving voltage according to the driving mode.

In an exemplary embodiment the light source driving voltage in the 3D mode may be larger than that in the 2D mode.

In an exemplary embodiment the controller may generate a common voltage set to 0V in the 2D mode and outputs the common voltage to the common electrode.

In an exemplary embodiment a display apparatus includes: a display panel configured to display an image; a light source part configured to provide a light to the display panel; a liquid crystal lens disposed on the display panel, and including a plurality of unit lenses, each of the unit lenses being formed by a first substrate including a plurality of lens electrodes, a second substrate including a common electrode, and a liquid crystal layer disposed between the first and second substrates; and a controller configured to identify a driving mode, the driving mode including a two-dimensional ("2D") mode and a three-dimensional ("3D") mode, and to drive the unit lenses, driving timings of the unit lenses being different from each other in the 3D mode.

In an exemplary embodiment the controller may generate lens control signals having timings different from each other, and outputs the lens control signals to lens driving chips respectively connected to the lens electrodes.

In an exemplary embodiment a multi-dimensional mode display device, includes: a light source, a display panel on the light source and configured to display a two-dimensional (2D) image in a 2D mode and to display a three-dimensional (3D) stereoscopic image in a 3D mode, a liquid crystal lens panel on the display panel and having a plurality of unit lens electrodes on a first lens panel substrate, a common lens electrode on a second lens panel substrate and a lens panel liquid crystal layer disposed between the first lens panel substrate and the second lens panel substrate, and a respective liquid crystal lens panel driver coupled to each of the unit lens electrodes at opposing ends of the first lens panel substrate, each of the unit lens electrodes being driven at different timings from each other. A common voltage applied to the common lens electrode is varied based upon the coupling capacitance between the unit lens electrodes and the common lens electrode such that the level of the common voltage applied to the common lens electrode is maintained substantially uniform. A light source driving voltage applied to the light source in 3D mode is larger than a light source driving voltage applied to the light source in 2D mode. When the mode is changed from 3D mode to 2D mode, the common voltage is set to 0V.

According to the method of driving the liquid crystal lens, the liquid crystal lens module for performing the method, and the display apparatus including the liquid crystal lens module, the 2D image and the 3D stereoscopic image may be effectively displayed.

BRIEF DESCRIPTION OF THE DRAWINGS

Exemplary embodiments of the present invention will be described in detail with reference to the accompanying drawings, in which.

DETAILED DESCRIPTION

Figure 1:
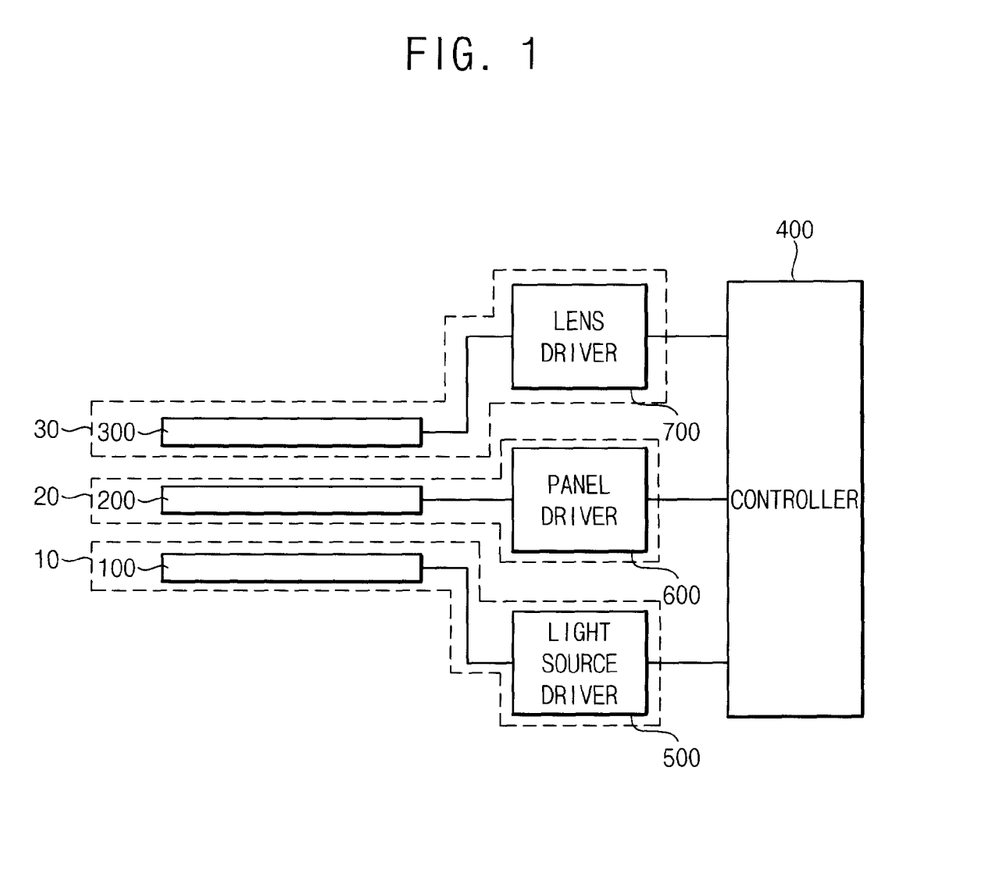
FIG. 1 is a block diagram illustrating a display apparatus according to an exemplary embodiment of the present invention.
Figure 2:
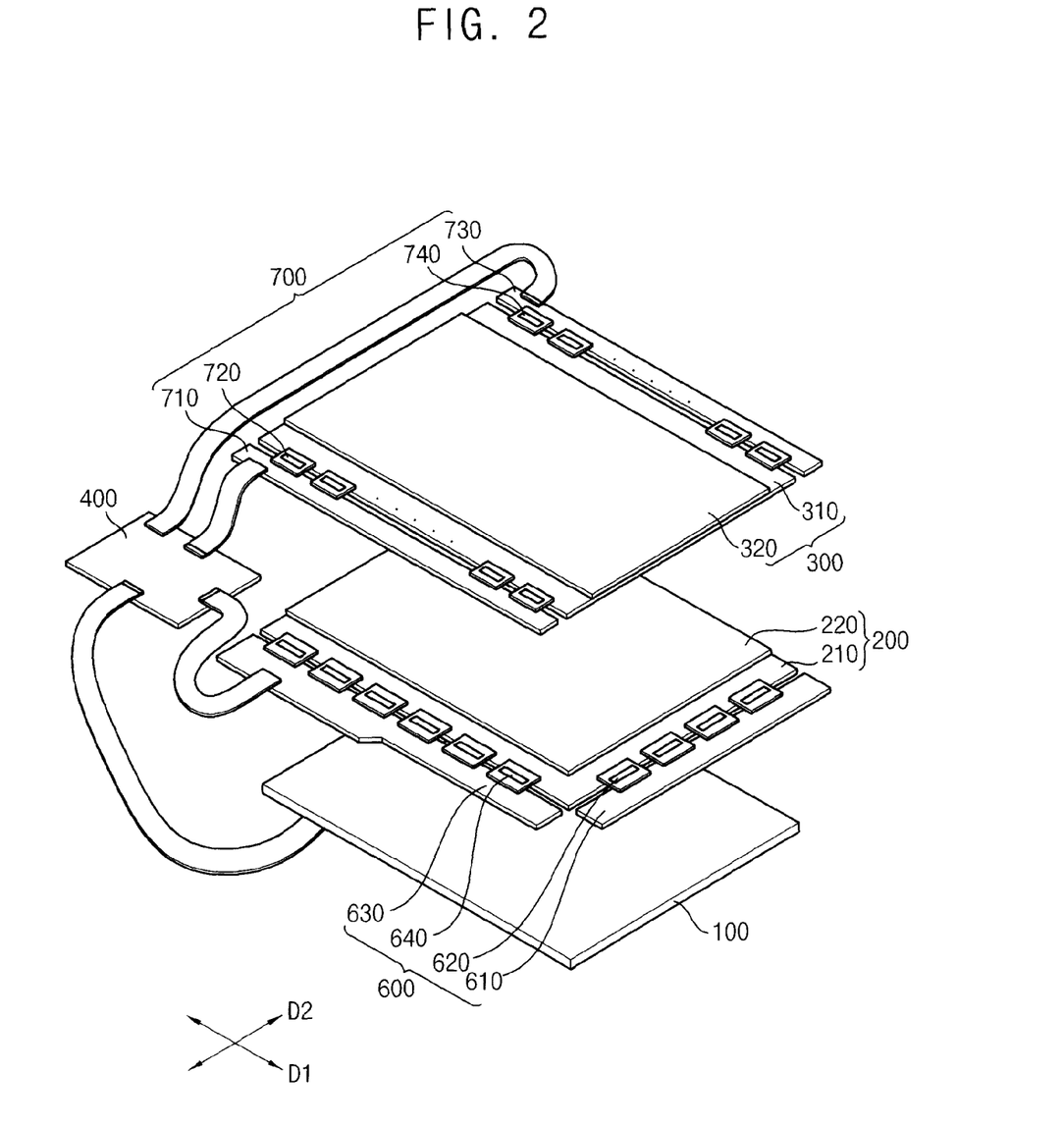
FIG. 2 is an exploded perspective view illustrating the display apparatus of FIG. 1.

Referring now to FIGS. 1 and 2, the display apparatus includes a light source module 10, a display panel module 20 and a liquid crystal lens module 30. The light source module 10 includes a light source part 100, light source controller (not shown) and a light source driver 500. The display panel module 20 includes a display panel 200, a panel controller (not shown) and a panel driver 600. The liquid crystal lens module 30 includes a liquid crystal lens 300, a lens controller (not shown) and a lens driver 700.

The display apparatus collectively includes the light source part 100, the display panel 200, the liquid crystal lens 300, a controller 400, the light source driver 500, the panel driver 600 and the lens driver 700.

The light source part 100 provides light to the display panel 200. The light source part 100 includes a light source that generates the light. For example, the light source may include a cold cathode fluorescent lamp ("CCFL"), an external electrode fluorescent lamp ("EEFL"), a flat fluorescent lamp ("FFL"), a light emitting diode ("LED"). The light source part 100 may be a backlight assembly.

The light source part 100 may be a direct type light source part which is disposed under the display panel 200 to provide the light to the display panel 200. Alternatively, the light source part 100 may be an edge type light source part which is disposed at an edge of the display panel 200 to provide reflected light to the display panel 200. When the light source part 100 is the edge type light source part, the light source part 100 may further include a light guide plate (not shown) to provide for the reflection of light from the light source toward the display panel.

The display panel 200 is disposed on the light source part 100. The display panel includes a first panel substrate 210, a second panel substrate 220 and a panel liquid crystal layer (not shown) disposed between the first and second panel substrates 210, 220.

The display panel 200 includes a plurality of gate lines (not shown), a plurality of data lines (not shown) and a plurality of pixels connected to the gate lines and the data lines.

Each pixel includes a switching element (not shown), a liquid crystal capacitor (not shown) and a storage capacitor (not shown) which are electrically connected to the switching element.

The gate lines, the data lines, pixel electrodes (not shown) and storage electrodes (not shown) are disposed on the first panel substrate 210. A panel common electrode is disposed on the second panel substrate 220.

The display panel 200 may display a 2D image in a 2D mode. The display panel 200 may also display a 3D stereoscopic image in a 3D mode. Images can be of various gray scales or in color, such when the display panel includes typical red, green and blue filtering of the pixels and/or combinations of sub-pixels. While exemplary embodiments disclose a LCD display panel, those skilled in the art can appreciate that other display panel technologies can be implemented, such as OLED display panels, and the like.

The liquid crystal lens 300 is disposed on the display panel 200. The liquid crystal lens 300 includes a first substrate 310, a second substrate 320 and a liquid crystal layer (not shown) disposed between the first and second substrates 310, 320.

The liquid crystal lens 300 includes a plurality of unit lenses. The unit lenses are disposed in the first direction D1. Each of the unit lenses extends in a second direction D2 crossing the first direction D1. Each of the unit lenses may extend in a direction inclined with respect to the second direction D2.

A plurality of lens electrodes is disposed on the first substrate 310. A common electrode is disposed on the second substrate 320.

The lens electrodes and the common electrode may include Indium Zinc Oxide ("IZO") which provides for high transparency. Other materials having good transparency, such as Indium Tin Oxide ("ITO"), and the like, may be used.

When a driving voltage is applied to the lens electrodes and the common electrode, an arrangement of liquid crystal molecules of the liquid crystal layer is adjusted so that the liquid crystal lens 300 has a refractive distribution as a lens.

The liquid crystal lens 300 can be driven in the 2D mode or 3D mode. For example, in 2D mode, the liquid crystal lens 300 passes an image provided from the display panel 200 without refraction. Thus, an observer views the 2D image. When in 3D mode, the liquid crystal lens 300 functions as a lens so that the liquid crystal lens 300 refracts an image provided from the display panel 200. Thus, an observer views a 3D stereoscopic image.

The controller 400 receives input image data, input lens data and input control signal from outside.

The input image data may include 2D image data and 3D stereoscopic image data. The input image data may include red image data, green image data and blue image data. The input lens data may include voltages provided to the lens electrodes to represent refractivity of the liquid crystal lens 300. The input control signal may include a master clock signal, a vertical synchronizing signal, an inverting signal and so on.

The controller 400 may identify a driving mode, which includes the 2D mode and the 3D mode, based upon the input image data. Alternatively, the controller 400 may receive the driving mode from outside.

The controller 400 includes the light source controller, the panel controller and the lens controller. The light source controller, the panel controller and the lens controller may be physically located in one controller structure, but logically divided to provide separate light source, panel and lens control operations. The light source controller, the panel controller and the lens controller may also be physically located in separate respective controller structures.

The light source controller generates and outputs a light source control signal. The light source controller may generate various light source control signals according to the driving mode.

The panel controller generates a panel driving signal and a panel data signal based upon the driving mode, the input control signal and the input image data. The panel controller outputs the panel driving signal and the panel data signal to the panel driver 600.

The panel driving signal may include a first control signal for controlling a driving timing of a gate driver of the panel driver 600 and a second control signal for controlling a driving timing of a data driver of the panel driver 600.

The lens controller generates a lens control signal and a lens data signal based upon the driving mode, the input control signal and the input lens data. The lens controller outputs the lens control signal and the lens data signal to the lens driver 700.

The lens control signal may include a horizontal start signal and a load signal.

The controller 400 will be further explained below in detail referring to FIG. 4.

The light source driver 500 receives the light source control signal. The light source driver 500 generates a light source driving voltage for driving the light source. The light source driver 500 outputs the light source driving voltage to the light source part 100. The light source driver 500 may include a DC (direct current)/DC converter.

The light source driver 500 may be disposed under the light source part 100. The light source driver 500 may be disposed out of a receiving container (not shown) facing a bottom surface of the receiving container.

The panel driver 600 includes the gate driver and the data driver.

The gate driver receives the first control signal from the panel controller. The gate driver generates gate signals for driving the gate lines of the display panel 200 in response to the first control signal. The gate driver sequentially outputs the gate signals to the gate lines of the display panel 200.

The gate driver may include a gate printed circuit board ("PCB") 610 and a gate driving chip 620. The gate PCB 610 is connected to the controller 400. The gate PCB 610 may be connected to the controller 400 through a cable or a wire. The gate driving chip 620 may be disposed on a tape carrier package ("TCP") connecting the gate PCB 610 to the first substrate 210 of the display panel 200.

Alternatively, the gate driver may be directly mounted on the display panel 200. The gate driver may be integrated on the display panel 200.

The data driver receives the panel data signal and the second control signal from the panel controller. The data driver converts the data signal into analog data voltages in response to the second control signal. The data driver sequentially outputs the analog data voltages to the data lines of the display panel 200.

The data driver may include a data PCB 630 and a data driving chip 640. The data PCB 630 is connected to the controller 400. The data PCB 630 may be connected to the controller 400 through a cable or a wire. The data driving chip 640 may be disposed on a TCP connecting the data PCB 630 to the first substrate 210 of the display panel 200.

Alternatively, the data driver may be directly mounted on the display panel 200. The data driver may be integrated on the display panel 200.

The lens driver 700 receives the lens data signal and the lens control signal from the lens controller. The lens driver 700 converts the lens data signal to analog lens voltages in response to the lens control signal. The lens driver 700 sequentially outputs the analog lens voltages to the lens electrodes of the liquid crystal lens 300.

The lens driver 700 includes a first lens driver disposed adjacent to a first side of the liquid crystal lens 300 and a second lens driver disposed adjacent to a second side of the liquid crystal lens 300 facing the first side.

The first lens driver may include a first lens PCB 710 and a first lens driving chip 720. The first lens PCB 710 is connected to the controller 400. The first lens PCB 710 may be connected to the controller 400 through a cable or a wire. The first lens driving chip 720 may be disposed on a TCP connecting the first lens PCB 710 to the first substrate 310 of the liquid crystal lens 300.

The second lens driver may include a second lens PCB 730 and a second lens driving chip 740. The second lens PCB 730 is connected to the controller 400. The second lens PCB 730 may be connected to the controller 400 through a cable or a wire. The second lens driving chip 740 may be disposed on a TCP connecting the second lens PCB 720 to the first substrate 310 of the liquid crystal lens 300.

Alternatively, the first and second lens drivers may be directly mounted on the liquid crystal lens 300. The first and second lens drivers may be integrated on the liquid crystal lens 300.

Figure 3:
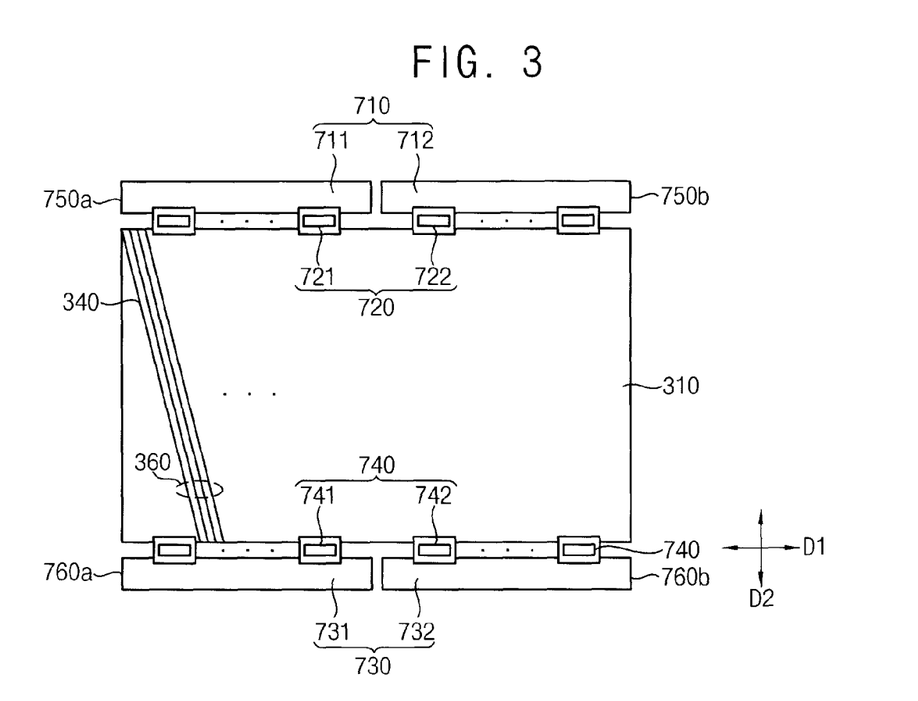
FIG. 3 is a plan view illustrating a first substrate of a liquid crystal lens and a lens driver of FIG. 1.

FIG. 3 is a plan view illustrating the first substrate 310 of the liquid crystal lens 300 and the first and second lens PCBs 710, 730 of lens driver 700 of FIG. 1.

The plurality of the lens electrodes 340 is disposed on the first substrate 310. The lens electrodes may have various widths. The lens electrodes may be divided into several groups 360. Each group of the lens electrodes forms a unit lens. For example, lens electrodes 340 at an edge portion in a group may have a relatively small width, and lens electrodes at a central portion in the group may have a relatively great width. Alternatively, lens electrodes in a group may have the substantially same width.

The lens electrodes are disposed in the first direction D1. The lens electrodes extend in the second direction D2 crossing the first direction D1. As depicted in the exemplary embodiment of FIG. 3, the lens electrodes 340 may extend in a direction inclined with respect to the second direction D2.

The first lens driver and the second lens driver may respectively have a plurality of sub lens drivers according to a size of the liquid crystal lens 300.

In FIG. 3, the first lens driver disposed adjacent to the first side of the liquid crystal lens 300 includes a first sub lens driver 750a and a second sub lens driver 750b. The second lens driver disposed adjacent to the second side of the liquid crystal lens 300 facing the first side includes a third sub lens driver 760a and a fourth sub lens driver 760b.

The first sub lens driver includes a first sub PCB 711 and a first sub driving chip 721. The second sub lens driver 750b includes a second sub PCB 712 and a second sub driving chip 722. The third sub lens driver includes a third sub PCB 731 and third sub driving chip 741. The fourth sub lens driver includes a fourth sub PCB 732 and a fourth sub driving chip 742.

The number of the first to fourth sub driving chips 721, 722, 741, 742 may be determined by a size of the liquid crystal lens 300.

The first lens driver is connected to first end portions of the lens electrodes to output lens voltages to the lens electrodes. The second lens driver is connected to second end portions of the lens electrodes opposite to the first end portions to output the lens voltages to the lens electrodes.

According to the present exemplary embodiment, the lens electrodes are driven by the first lens driver and the second lens driver so that an RC (resistance-capacitance) response delay of the lens electrodes may be compensated.

Figure 4:
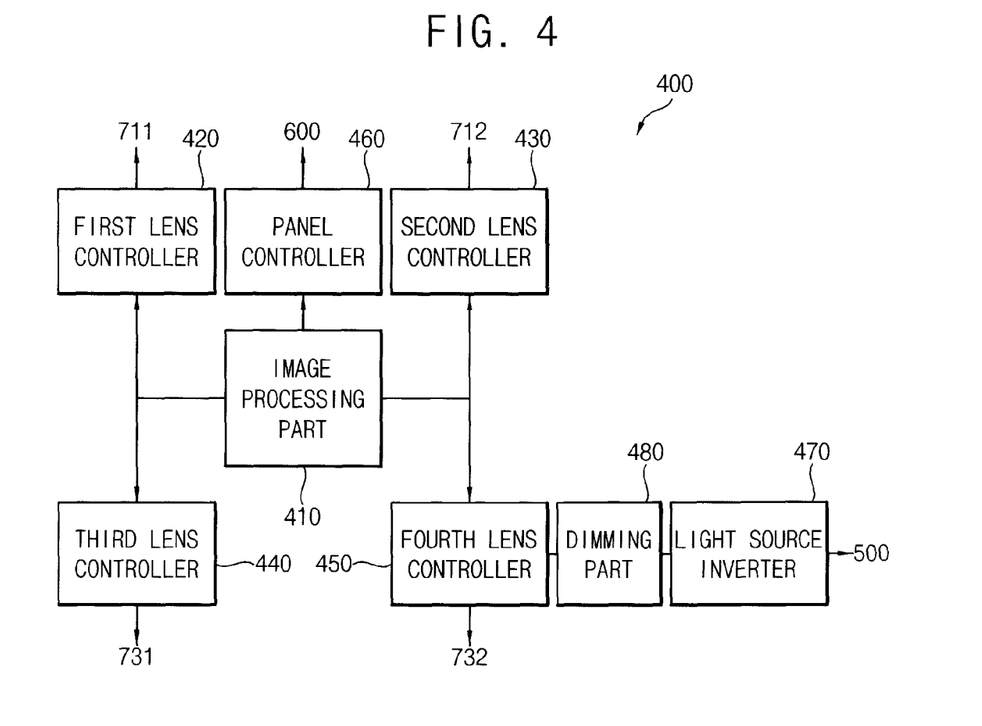
FIG. 4 is a block diagram illustrating a controller of FIG. 1.

Referring now to FIG. 4, which is a block diagram illustrating the controller 400 of FIG. 1, the controller 400 includes an image processing part 410, the panel controller 460, a light source inverter 470 and a plurality of sub lens controllers corresponding to the number of the sub lens drivers. When the lens driver 700 includes four sub lens drivers as shown in FIG. 3, the controller 400 may include a first lens controller 420, a second lens controller 430, a third lens controller 440 and a fourth lens controller 450 as shown in FIG. 4.

The controller 400 may further include a dimming part 480 controlling an operation of the light source inverter 470 according to the driving mode. Although in the exemplary embodiment depicted in FIG. 4 the dimming part 480 and the light source inverter 470 are connected to the fourth lens controller 450, the dimming part 480 and the light source inverter 470 may be connected to one of the first to third lens controllers 420, 430, 440. Alternatively, the dimming part 480 and the light source inverter 470 may be connected to a plurality of the lens controllers.

The image processing part 410 receives the input image data, the input lens data and the input control signal. The image processing part 410 may identify the driving mode based upon the input image data. Alternatively, a driving mode identifying part identifying the driving mode may be formed independently from the image processing part 410.

The image processing part 410 outputs the input control signal and the driving mode to the panel controller 460.

When the driving mode is the 2D mode, the image processing part 410 outputs the input image data to the panel controller 460.

When the driving mode is the 3D mode, the image processing part 410 operates rendering of the input image data to generate the 3D stereoscopic image data. The image processing part 410 outputs the 3D stereoscopic image data to the panel controller 460.

The image processing part 410 outputs the input control signal, the driving mode and the input lens data to the first to fourth lens controllers 420, 430, 440, 450.

When the driving mode is the 2D mode, the first to fourth lens controllers 420, 430, 440, 450 do not operate. For example, the first to fourth lens controllers 420, 430, 440, 450 may output a lens data signal of 0 volt ("V") to the first to fourth sub PCBs 711, 712, 731, 732.

When the driving mode is the 3D mode, the first to fourth lens controllers 420, 430, 440, 450 redistribute the input lens data to generate the lens data signal. In addition, the first to fourth lens controllers 420, 430, 440, 450 generate the lens control signal based upon the input control signal. The first to fourth lens controllers 420, 430, 440, 450 outputs the lens data signal and the lens control signal to the first to fourth sub PCBs 711, 712, 731, 732.

For example, the lens control signal may include the horizontal start signal and the load signal. The horizontal start signal may have a cycle substantially the same as a cycle of the vertical synchronizing signal of the input image data. The cycle of the horizontal start signal may be substantially same as a frame cycle of the input image data.

The operation of the first to fourth lens controllers 420, 430, 440, 450 may be substantially same as each other. An exemplary operation of the first lens controller 420 is explained in detail later below, referring to FIG. 5.

The panel controller 460 generates the panel control signal and the panel data signal based upon the driving mode, the input control signal and the input image data. The panel controller 460 outputs the panel driving signal and the panel data signal to the panel driver 600.

The light source inverter 470 generates the light source control signal. The light source inverter 470 outputs the light source control signal to the light source driver 500. The light source control signal may be a voltage.

The dimming part 480 is connected to the fourth lens controller 450 and the light source inverter 470. The dimming part 480 receives the driving mode from the fourth lens controller 450 to control a level of the light source control signal. The operation of the dimming part 480 is explained in detail later below, referring to FIG. 10

Figure 5:
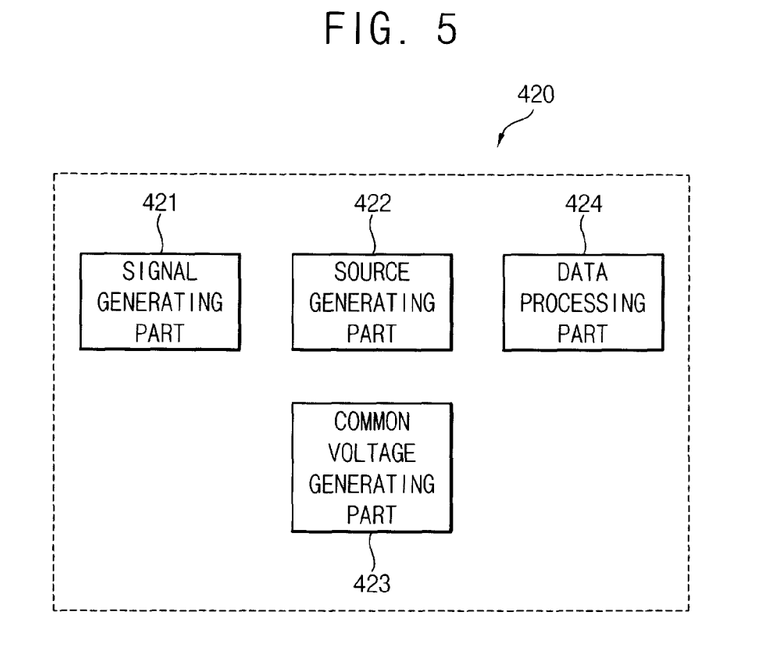
FIG. 5 is a block diagram illustrating a first lens controller of FIG. 4.

FIG. 5 is a block diagram illustrating the first lens controller 420 of FIG. 4.

Referring to FIGS. 4 and 5, the first lens controller 420 includes a signal generating part 421, a source generating part 422, a common voltage generating part 423 and a data processing part 424.

The signal generating part 421 receives the driving mode and the input control signal from the image processing part 410. When the driving mode is the 3D mode, the signal generating part 421 generates the lens control signal and outputs the lens control signal to the first sub lens driver 750a.

The source generating part 422 generates a source current for the first sub lens driver connected to the first lens controller 420. The source generating part 422 outputs the source current to the first sub lens driver 750a.

The common voltage generating part 423 generates the common voltage applied to the common electrode on the second substrate 320 of the liquid crystal lens 300. The common voltage generating part 423 outputs the common voltage to the second substrate 320. The common voltage may be applied to the second substrate 320 through the first sub lens driver 750a. Although the common voltage generating part 423 is disposed in the first lens controller 420, the common voltage generating part 423 may be disposed in one of the second to fourth lens controllers 430, 440, 450. Alternatively, the common voltage generating part 423 may be disposed in a plurality of the lens controllers.

The data processing part 424 receives the driving mode and the input lens data from the image processing part 410. When the driving mode is the 3D mode, the data processing part 424 redistributes the input lens data to generate the lens data signal. The data processing part 424 outputs the lens data signal to the first sub lens driver 750a.

Figure 6:
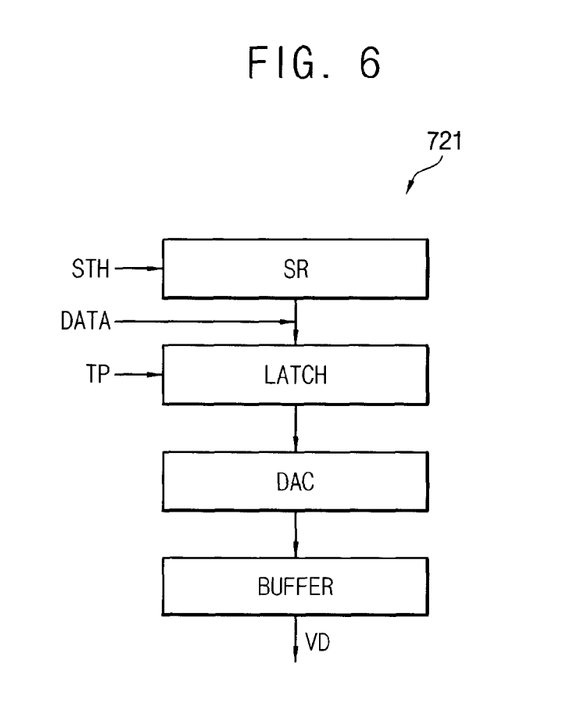
FIG. 6 is a block diagram illustrating a first sub driving chip of FIG. 3.

FIG. 6 is a block diagram illustrating the first sub driving chip 721 of FIG. 3.

Referring to FIG. 6, the first sub driving chip 721 receives the lens control signal and the lens data signal DATA from the first lens controller 420. The lens control signal includes the horizontal start signal STH and the load signal TP.

The first sub driving chip 721 includes a shift register SR, a latch LATCH, a signal processing/digital to analog converting part DAC and a buffer part BUFFER. The shift register SR receives the horizontal start signal STH. The shift register SR outputs a latch pulse to the latch LATCH in response to the horizontal start signal STH. The latch LATCH temporally stores the lens data signal DATA. The latch LATCH outputs the lens data signal DATA to the signal processing/digital to analog converting part DAC in response to the load signal TP. The signal processing/digital to analog converting part DAC converts the lens data signal DATA having a digital type into the analog lens voltage VD. The signal processing part DAC outputs the analog lens voltage VD to the buffer part BUFFER. The buffer part BUFFER compensates a level of the analog lens voltage VD. The buffer part BUFFER outputs the compensated lens voltage VD to the first substrate 310 of the liquid crystal lens 300.

Figure 7:
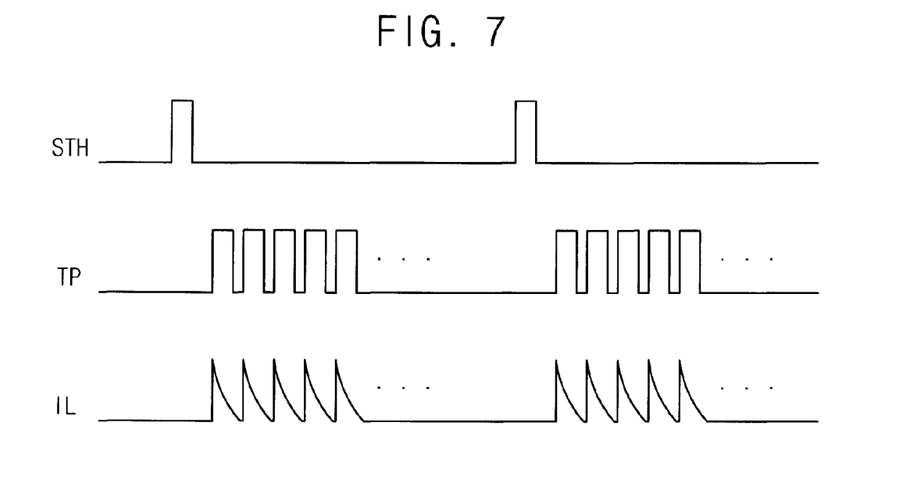
FIG. 7 is a waveform diagram illustrating a lens control signal generated by a signal generating part of FIG. 5 and a lens source current generated by a source generating part of FIG. 5.

FIG. 7 is a waveform diagram illustrating the lens control signals STH and TP generated by the signal generating part 421 of FIG. 5 and a lens source current IL generated by the source generating part 422 of FIG. 5.

Referring to FIG. 7, the horizontal start signal STH has pulse waves representing ON level repeated in a frame cycle. The load signal TP includes a plurality of pulse waves in a frame. The lens source current IL represents the source current transmitted to the lens driver 700. The lens source current IL is provided to the lens driver 700 at a rising edge of the load signal TP. The level of the lens source current IL is gradually decreased from the rising edge of the load signal TP.

The number of the pulse waves of the load signal TP may be substantially same as the number of the sub driving chips in FIG. 3.

For example, when the load signal TP generated by the signal generating part 421 of the first lens controller 420 has eight pulse waves in a frame, the first sub lens driver 750a includes eight first sub driving chips 721 connected to the first sub PCB 711. A first pulse wave of the load signal TP corresponds to the first sub driving chip 721 of the first sub lens driver 750a. A second pulse wave of the load signal TP corresponds to the second sub driving chip 721 of the first sub lens driver 750a.

Thus, driving timings of unit lenses connected to the first sub driving chip are different from driving timings of unit lenses connected to the second sub driving chip.

According to the present exemplary embodiments, driving timings of unit lenses are different from each other so that a peak value of the lens source current IL may be decreased. Therefore, damage of the source generating part 422 and the lens driver 700 may be prevented, and power consumption may be decreased.

In addition, the first sub driving chips 721 are driven in a frame, the liquid crystal lens 300 may properly function as a lens.

Figure 8:
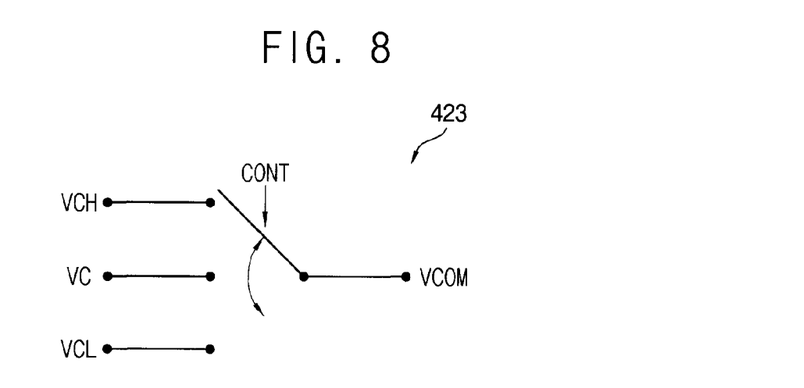
FIG. 8 is a conceptual diagram illustrating the operation of a common voltage generating part of FIG. 5.
Figure 9:
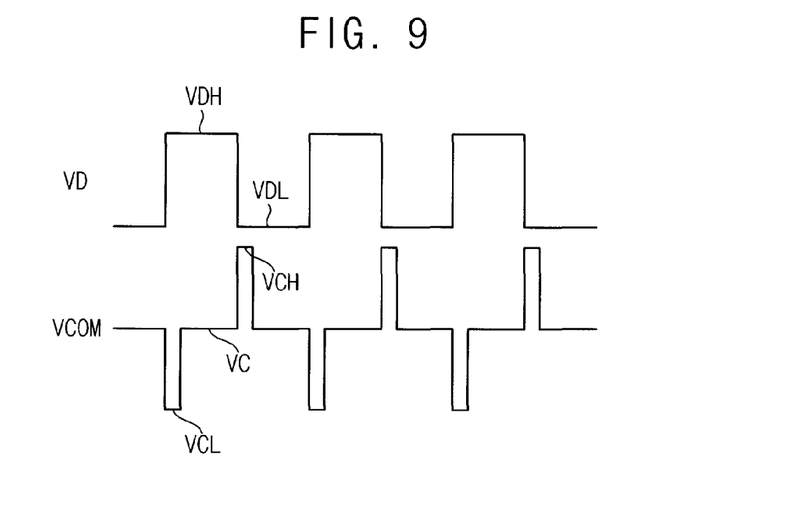
FIG. 9 is a waveform diagram illustrating a lens voltage outputted from a lens driving chip of FIG. 2 and a common voltage generated by the common voltage generating part of FIG. 5.

FIG. 8 is a conceptual diagram illustrating the operation of the common voltage generating part 423 of FIG. 5. FIG. 9 is a waveform diagram illustrating the lens voltage VD outputted from the lens driving chips 720, 740 of FIG. 2 and the common voltage VCOM generated by the common voltage generating part 423 of FIG. 5;

Referring to FIGS. 2, 5, 8 and 9, the common voltage generating part 423 generates the common voltage VCOM. The common voltage generating part 423 applies the common voltage VCOM to the common electrode of the second substrate 320 of the liquid crystal lens 300. The lens electrode and the common electrode have a relatively high coupling capacitance.

Thus, when the common voltage generating part 423 generates the common voltage VCOM having a substantially uniform level, the level of the common voltage VCOM is changed at a rising edge and a falling edge of the lens voltage VD applied to the lens electrode.

For example, the level of the common voltage VCOM may be increased at the rising edge of the common voltage VCOM, at which the common voltage VCOM increases from a low lens voltage VDL to a high lens voltage VDH. The level of the common voltage VCOM may be decreased at the falling edge of the common voltage VCOM, at which the common voltage VCOM decreases from the high lens voltage VDH to the low lens voltage VDL. Thus, the operation of the liquid crystal lens 300 may deteriorate.

The common voltage generating part 423 of the present exemplary embodiment selectively generates a first voltage VC, a second voltage VCH and a third voltage VCL.

The first voltage VC is a normal common voltage. The second voltage VCH is larger than the first voltage VC. The third voltage VCL is smaller than the first voltage VC.

The common voltage generating part 423 generates the common voltage VCOM having a level of the second voltage VCH at the falling edge of the lens voltage VD. The common voltage generating part 423 generates the common voltage VCOM having a level of the third voltage VCL at the rising edge of the lens voltage VD. The common voltage generating part 423 generates the common voltage having a level of the first voltage VC except for the rising edge and the falling edge of the lens voltage VD.

The second voltage VCH and the third voltage VCL may be set corresponding to the input lens data.

The common voltage generating part 423 may include a switch, such as a thin film transistor (TFT) switch. The common voltage generating part 423 may include an analog multiplexer ("MUX"). The common voltage generating part 423 may further include a counter.

A control signal CONT of the common voltage generating part 423 may be generated using the vertical synchronizing signal and the inverting signal of the input image data. The control signal CONT may be generated using an output signal of the counter. The counter may be used to set output duration of the second voltage VCH from the falling edge. The counter may be used to set output duration of the third voltage VCL from the rising edge.

According to the present exemplary embodiment, the increase and decrease of the common voltage VCOM due to the coupling capacitance between the lens electrode and the common electrode may be compensated such that the level of the common voltage VCOM may be maintained substantially uniform in the liquid crystal lens 300.

Figure 10:
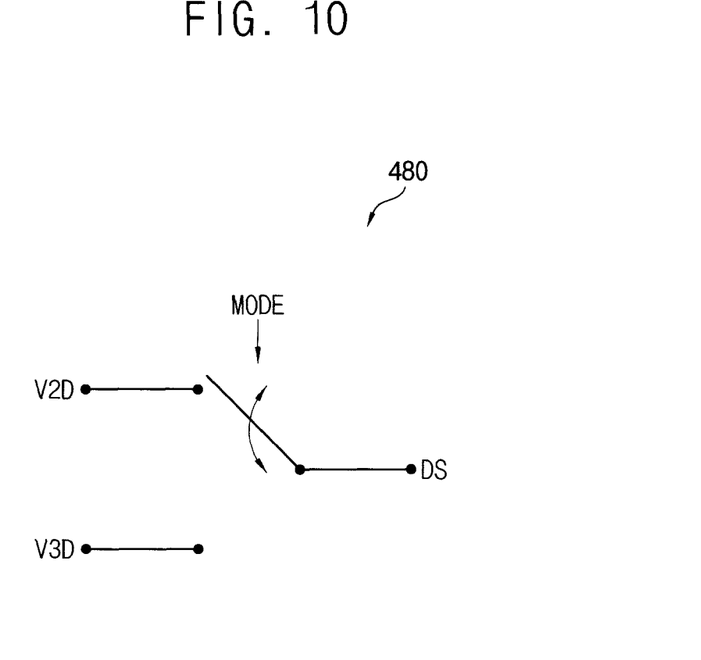
FIG. 10 is a conceptual diagram illustrating an operation of a dimming part of FIG. 4.

FIG. 10 is a conceptual diagram illustrating the operation of the dimming part 480 of FIG. 4.

In the 2D mode, the liquid crystal lens 300 passes an image provided from the display panel 200 without refraction. In the 3D mode, the liquid crystal lens 300 refracts an image provided from the display panel 200. Thus, the luminance of the display panel 200 in the 3D mode is lower than a luminance of the display panel 200 in the 2D mode.

Referring to FIGS. 4 and 10, the dimming part 480 outputs light source control signal DS having different values according to the driving mode MODE. When the driving mode MODE is the 2D mode, the dimming part 480 outputs a 2D dimming signal V2D. When the driving mode MODE is the 3D mode, the dimming part 480 outputs a 3D dimming signal V3D.

The 3D dimming signal V3D is larger than the 2D dimming signal V2D. For example, the 3D dimming signal V3D may be larger than the 2D dimming signal V2D by 10%.

The light source driver 500 applies light source driving voltage having different levels according to the driving mode MODE. The light source driving voltage in the 3D mode is larger than the light source driving voltage in the 2D mode.

The dimming part 480 may include a switch, such as a TFT switch. The dimming part 480 may include an analog MUX. A control signal of the dimming part 480 may be the driving mode MODE.

A ground isolator (not shown) may be further formed between the fourth lens controller 750 and the dimming part 480. The ground isolator transmits the driving mode MODE from the fourth lens controller 750 to the dimming part 480 with isolating a ground of the fourth lens controller 750 and a ground of the dimming part 480.

The image processing part 410 and the first to fourth lens controller 420, 430, 440, 450 are driven by a relatively low voltage, but the light source inverter 470 is driven by a relatively high voltage. Thus, a ground of the image processing part 410 and the first to fourth lens controller 420, 430, 440, 450 and a ground of the light source inverter 470 are isolated by the ground isolator so that the liquid crystal lens 300 may be stably driven.

According to the present exemplary embodiments, the display apparatus may have a substantially uniform luminance regardless of the driving mode MODE by the dimming part 480.

Figure 11:
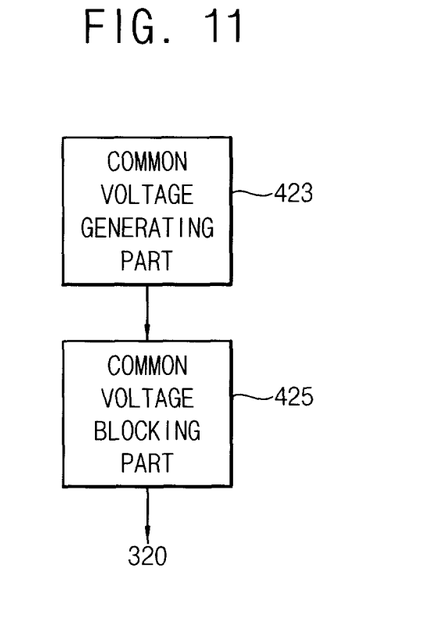
FIG. 11 is a block diagram illustrating the common voltage generating part of FIG. 5 and a common voltage blocking part connected to the common voltage generating part.
Figure 12:
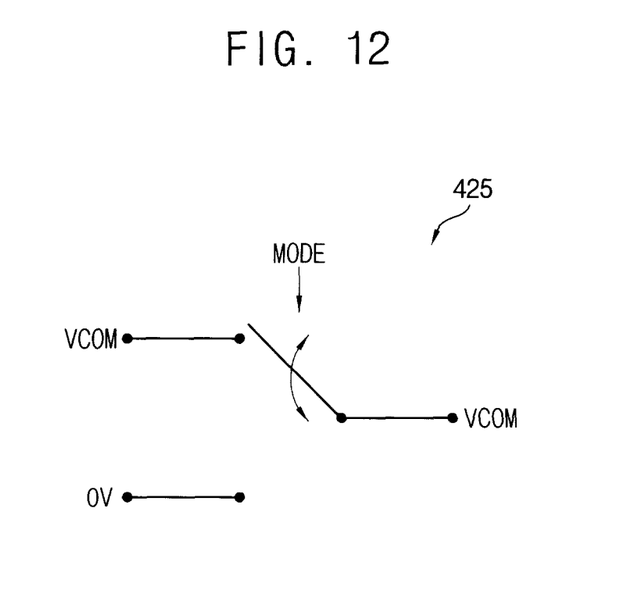
FIG. 12 is a conceptual diagram illustrating an operation of the common voltage blocking part of FIG. 11.
Figure 13:
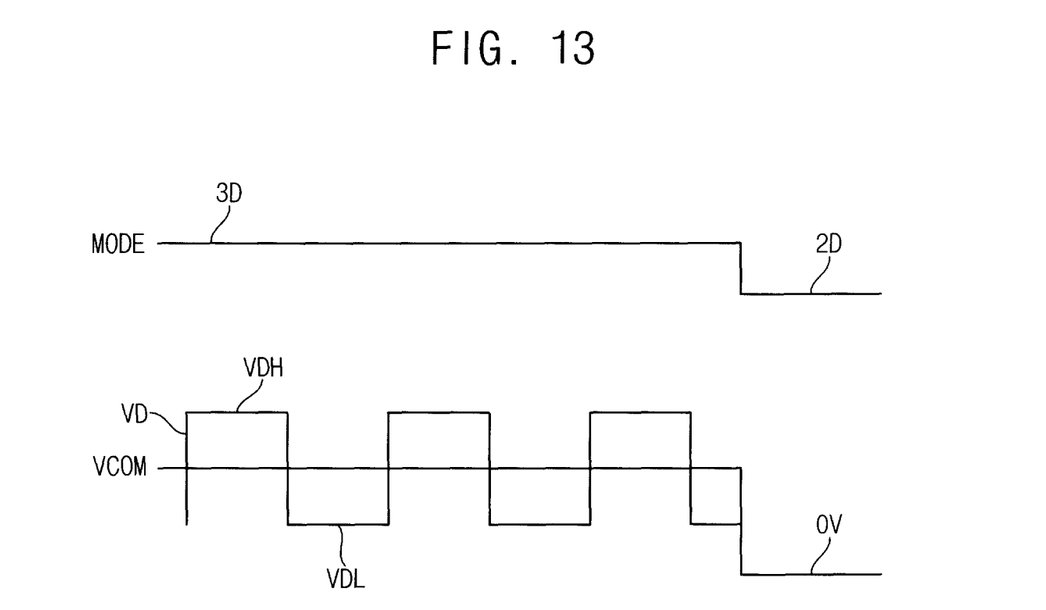
FIG. 13 is a waveform diagram illustrating a driving mode identified by an image processing part of FIG. 4, the lens voltage outputted from the lens driving chips of FIG. 2, and the common voltage passing through the common voltage blocking part of FIG. 11.

FIG. 11 is a block diagram illustrating the common voltage generating part 423 of FIG. 5 and a common voltage blocking part 425 connected to the common voltage generating part 423. FIG. 12 is a conceptual diagram illustrating an operation of the common voltage blocking part 425 of FIG. 11. FIG. 13 is a waveform diagram illustrating the driving mode MODE identified by the image processing part 410 of FIG. 4, the lens voltage VD outputted from the lens driving chips 720, 740 of FIG. 2, and the common voltage passing through the common voltage blocking part of FIG. 11.

When the driving mode MODE is changed from the 3D mode to the 2D mode, the lens voltage of the lens electrode may be dropped to 0V by the lens driver 700. In contrast, the common voltage VCOM may be gradually decreased to 0V. Thus, an image sticking may occur at the liquid crystal lens 300 such that the display quality is decreased in the 2D mode.

Referring to FIGS. 11 and 12, the common voltage generating part 423 generates the common voltage VCOM. The common voltage generating part 423 applies the common voltage VCOM to the second substrate 320 of the liquid crystal lens 300. The common voltage blocking part 425 may selectively output the common voltage according to the driving mode MODE.

In the 3D mode, the common voltage blocking part 425 passes the common voltage VCOM generated by the common voltage generating part 423 without blocking.

In the 2D mode, the common voltage blocking part 425 sets the common voltage VCOM to 0V.

The common voltage blocking part 425 may include a switch, such as a TFT switch. The common voltage blocking part 425 may include a power metal oxide semiconductor field effect transistor ("MOSFET"). A control signal of the common voltage blocking part 425 may be the driving mode MODE.

Referring to FIG. 13, when the driving mode MODE is changed from the 3D mode to the 2D mode, the lens voltage VD increasing and decreasing between the high lens voltage VDH and the low lens voltage VDL is immediately dropped to 0V.

When the driving mode MODE is changed from the 3D mode to the 2D mode, the common voltage VCOM is immediately dropped to 0V.

According to the present exemplary embodiment, when the driving mode MODE is changed from the 3D mode to the 2D mode, the common voltage VCOM is set to 0V so that the image sticking of the liquid crystal lens 300 may be prevented. Thus, a display quality of the display apparatus may be improved.

As explained above, the method of driving the liquid crystal lens, the liquid crystal lens module and the display apparatus according to exemplary embodiments of the present invention, the lens electrodes are driven by the first lens driver and the second lens driver such that an RC response delay may be compensated.

In addition, driving timings of unit lenses are different from each other such that damage of the source generating part and the lens driver may be prevented, and power consumption may be decreased.

In addition, the increase and decrease of the common voltage due to the coupling capacitance between the lens electrode and the common electrode may be compensated such that the level of the common voltage may be substantially uniformly maintained in the liquid crystal lens.

In addition, a dimming part may provide the display apparatus with a substantially uniform luminance regardless of the driving mode.

In addition, when the driving mode is changed from the 3D mode to the 2D mode, the image sticking of the liquid crystal lens 300 may be prevented so that a display quality of the display apparatus may be improved.

Those skilled in the art can appreciate that exemplary embodiments can span from 2D/3D mobile devices such as cell phones, to large 2D/3D screen displays, such as in 81" large screen LCD televisions.

Although a few exemplary embodiments of the present invention have been described, those skilled in the art will readily appreciate that many modifications are possible in the exemplary embodiments. Accordingly, the disclosed exemplary embodiments and all such modifications are intended to be included within the scope of the following claims.

What is claimed is:

1. A method of driving a liquid crystal lens, the method comprising:
   identifying a driving mode, the driving mode including a two-dimensional ("2D") mode and a three-dimensional ("3D") mode; and
   driving unit lenses of the liquid crystal lens, driving timings of the unit lenses being different from each other in the 3D mode,
   wherein each of the unit lenses are formed by a first substrate, a second substrate, and a liquid crystal layer disposed between the first and second substrates,
   wherein driving the unit lenses comprises:
      selecting one of first, second and third voltages; and
      outputting the selected voltage to a common electrode as a common voltage,
   wherein one of the first, second and third voltages is selected using a vertical synchronizing signal of input image data and an inverting signal.

2. The method of claim 1, wherein: the first voltage is a normal common voltage, the second voltage is larger than the first voltage and is outputted at a failing edge of a lens voltage applied to a lens electrode, and the third voltage is smaller than the first voltage and is outputted at a rising edge of the lens voltage.

3. The method of claim 1, further comprising selectively generating a level of a light source driving voltage according to the driving mode.

4. The method of claim 3, wherein the light source driving voltage in the 3D mode is larger than that in the 2D mode.

5. The method of claim 1, wherein the common voltage is set to 0V in the 2D mode.

6. The method of claim 1,
   wherein respective unit lenses sequentially receive a lens control signal pulse,
   wherein each of the unit lenses are formed by a first substrate, a second substrate, and a liquid crystal layer disposed between the first and second substrates, and
   wherein the unit lenses are driven by a first lens driving chip and a second lens driving chip located at opposing ends of the same first substrate.

7. The method of claim 6, wherein driving the unit lenses further comprises outputting the lens control signals to lens driving chips respectively connected to a plurality of lens electrodes.

8. The method of claim 1, wherein driving the unit lenses further comprises:
   outputting a lens voltage to a first end portion of a lens electrode; and
   outputting the lens voltage to a second end portion of the lens electrode, the second end portion being opposite to the first end portion.

9. A liquid crystal lens module comprising:
   a liquid crystal lens including a plurality of unit lenses, each of the unit lenses being formed by a first substrate including a plurality of lens electrodes, a second substrate including a common electrode, and a liquid crystal layer disposed between the first and second substrates; and
   a controller configured to identify a driving mode, the driving mode including a two-dimensional ("2D") mode and a three-dimensional ("3D") mode, and to drive the unit lenses, driving timings of the unit lenses being different from each other in the 3D mode,
   wherein the controller generates a common voltage by selecting one of first, second and third voltages and outputs the common voltage to the common electrode, and
   wherein the controller selects one of the first, second and third voltages using a vertical synchronizing signal of input image data and an inverting signal.

10. The liquid crystal lens module of claim 9, wherein:
   the first voltage is a normal common voltage,
   the second voltage is larger than the first voltage and is outputted at a falling edge of a lens voltage applied to each of the lens electrodes, and
   the third voltage is smaller than the first voltage and is outputted at a rising edge of the lens voltage.

11. The liquid crystal lens module of claim 9, wherein the controller comprises a dimming part configured to selectively determine a level of a light source driving voltage according to the driving mode.

12. The liquid crystal lens module of claim 11, wherein the light source driving voltage in the 3D mode is larger than that in the 2D mode.

13. The liquid crystal lens module of claim 9, wherein the common voltage is set to 0V in the 2D mode.

14. The liquid crystal lens module of claim 9,
wherein respective unit lenses sequentially receive a lens control signal pulse, and
wherein the unit lenses are driven by a first lens driving chip and a second lens driving chip located at opposing ends of the same first substrate.

15. The liquid crystal lens module of claim 14, wherein the controller outputs the lens control signals to lens driving chips respectively connected to the lens electrodes.

16. The liquid crystal lens module of claim 9, further comprising a first lens driver disposed adjacent to a first side of the first substrate and a second lens driver disposed adjacent to a second side of the first substrate, wherein:
the first lens driver outputs a lens voltage to a first end portion of each of the lens electrodes, and
the second lens driver outputs the lens voltage to a second end portion of each of the lens electrode, the second end portion being opposite to the first end portion.

17. A multi-dimensional mode display device, comprising:
a light source;
a display panel on the light source and configured to display a two-dimensional (2D) image in a 2D mode and to display a three-dimensional (3D) stereoscopic image in a 3D mode;
a liquid crystal lens panel on the display panel and having a plurality of unit lens electrodes on a first lens panel substrate, a common lens electrode on a second lens panel substrate and a lens panel liquid crystal layer disposed between the first lens panel substrate and the second lens panel substrate; and
a respective liquid crystal lens panel driver coupled to each of the unit lens electrodes at opposing ends of the first lens panel substrate, each of the unit lens electrodes being driven at different timings from each other,
wherein a common voltage applied to the common lens electrode is varied based upon the coupling capacitance between the unit lens electrodes and the common lens electrode such that the level of the common voltage applied to the common lens electrode is maintained substantially uniform;
wherein a light source driving voltage applied to the light source in 3D mode is larger than a light source driving voltage applied to the light source in 2D mode; and
wherein when the 3D mode is changed to 2D mode, the common voltage is set to 0V.

* * * * *